US007229157B2

(12) United States Patent
Conta et al.

(10) Patent No.: US 7,229,157 B2
(45) Date of Patent: Jun. 12, 2007

(54) PROCESS FOR CONSTRUCTION OF A FEEDING DUCT FOR AN INK JET PRINTHEAD

(75) Inventors: Renato Conta, Ivrea (IT); Anna Merialdo, Ivrea (IT)

(73) Assignee: Telecom Italia S.P.A. (IL)

( * ) Notice: Subject to any disclaimer, the term of this patent is extended or adjusted under 35 U.S.C. 154(b) by 88 days.

(21) Appl. No.: 10/493,571

(22) PCT Filed: Oct. 24, 2002

(86) PCT No.: PCT/IT02/00678

§ 371 (c)(1),
(2), (4) Date: Apr. 26, 2004

(87) PCT Pub. No.: WO03/035401

PCT Pub. Date: May 1, 2003

(65) Prior Publication Data

US 2004/0252166 A1 Dec. 16, 2004

(30) Foreign Application Priority Data

Oct. 25, 2001 (IT) .............................. TO01A1019

(51) Int. Cl.
*B41J 2/05* (2006.01)
*G01D 5/127* (2006.01)

(52) U.S. Cl. .......................................... 347/63; 216/27

(58) Field of Classification Search .................. 216/27; 346/1.1; 438/21
See application file for complete search history.

(56) References Cited

U.S. PATENT DOCUMENTS 4,169,008 A 9/1979 Kurth
5,658,471 A * 8/1997 Murthy et al. ................ 216/27
6,164,762 A 12/2000 Zbrozek et al.
6,402,301 B1 * 6/2002 Powers et al. ................ 347/63
6,805,432 B1 * 10/2004 Milligan et al. .............. 347/65

FOREIGN PATENT DOCUMENTS

| | | |
|---|---|---|
| EP | 0 430 593 | 6/1991 |
| EP | 0 764 533 | 3/1997 |
| EP | 0 841 167 | 5/1998 |

* cited by examiner

*Primary Examiner*—Lamson Nguyen
*Assistant Examiner*—Lisa M. Solomon
(74) *Attorney, Agent, or Firm*—Venable LLP; Robert Kinberg; Steven J. Schwarz

(57) ABSTRACT

In an ink jet printhead, the ink feeding duct (2), passing through the thickness of the silicon substrate, and in hydraulic communication with the ejection cells (8) through an outlet area (2*a*) on the front surface (5) of the substrate (3), is built in three successive stages of erosion of the substrate (3), the first of which is performed on the rear surface (6) of the substrate, to produce a first cavity (24) having a depth (P1), and a further cavity (26) communicating and having a depth (P2), extending in the direction of the front surface (5), and presenting a back wall (28) separated from the front surface (5) by a diaphragm (30); the second stage is performed on the opposite front surface (5) to cut a channel (40) in the direction of the diaphragm (30), of depth (P4) and defining the contour of the outlet area (2*a*) on the front surface (5), and the third stage is performed from said rear surface (6) as a continuation of the erosion performed in the first stage, to remove the diaphragm (30) and open the duct (2) between the rear (6) and front (5) surfaces.

16 Claims, 2 Drawing Sheets

PROCESS FOR CONSTRUCTION OF A FEEDING DUCT FOR AN INK JET PRINTHEAD

This is a U.S. National Phase Application Under 35 USC 371 and applicant herewith claims the benefit of priority of PCT/IT02/00678 filed on Oct. 24, 2002, which was published Under PCT Article 21(2) in English, and of Application No. TO2001A001019 filed in Italy on Oct. 25, 2001.

TECHNICAL FIELD

This invention relates to an improved process for construction of a feeding duct for an ink jet printhead, particularly for a "top-shooter" type ink jet printhead, i.e. one in which the droplets of ink are ejected perpendicularly to the substrate containing the expulsion chambers and the heating elements.

SHORT DESCRIPTION OF THE STATE OF THE ART

As is known in the sector art, for example from Italian patent No. 1234800, and from U.S. Pat. No. 5,387,314, a printhead of the above-mentioned type is made using as the substrate a portion of a thin disk of crystalline silicon approx. 0.6 mm thick, on which are deposited by way of vacuum processes the heating elements, or resistors, made of portions of an electrically conducting layer and the relative connections with the outside; the resistors are arranged inside cells made in the thickness of a layer of photosensitive material, for instance VACREL™, and obtained together with the lateral ink feeding channels in a photolithographic process; the cells are filled with a volume of ink fed through a narrow, oblong feeding duct, shaped as a slot, which traverses the silicon substrate and communicates with the lateral channels of the cells. According to the known art, the slots are made with a wet etching applied to the end opposite the cells, and completed with a laser etching, or with sand blasting.

The known techniques for etching of the slots have the drawback that the edge of the slot facing the cells has geometrical irregularities caused either by the action of the grains of abrasive used for sand blasting, or by cracks and fissures caused by an incipient melting of the material if a laser beam is used for the etching; these irregularities disturb the flow of ink at the entrance to the cells and are particularly damaging in the case of very narrow slots, i.e. of width less than 250 μm approx., and in multiple heads with slots side by side in the same portion of the silicon substrate.

SUMMARY DESCRIPTION OF THE INVENTION

The main object of this invention is therefore that of defining an improved process for the manufacture of a feeding duct for an ink jet printhead exempt of the drawbacks mentioned above and in particular having a slot-like aperture of a very low width local to the expulsion cells, to permit multiple heads, and/or heads with a large number of nozzles, to be produced on the same silicon substrate, capable of ejecting very small droplets (<5 pl), particularly suitable for printing images with photographic resolution.

In accordance with this invention, an improved process for the manufacture of a feeding duct for an ink jet printhead, characterized as defined in the main claim, is now presented.

BRIEF DESCRIPTION OF THE DRAWINGS

This and other characteristics of the invention shall appear more clearly from the following description of a preferred embodiment of the process for processing the feeding duct, provided by way of non-restricting example, with reference to the figures in the accompanying drawings.

DETAILED DESCRIPTION OF THE INVENTION

Figure 1:
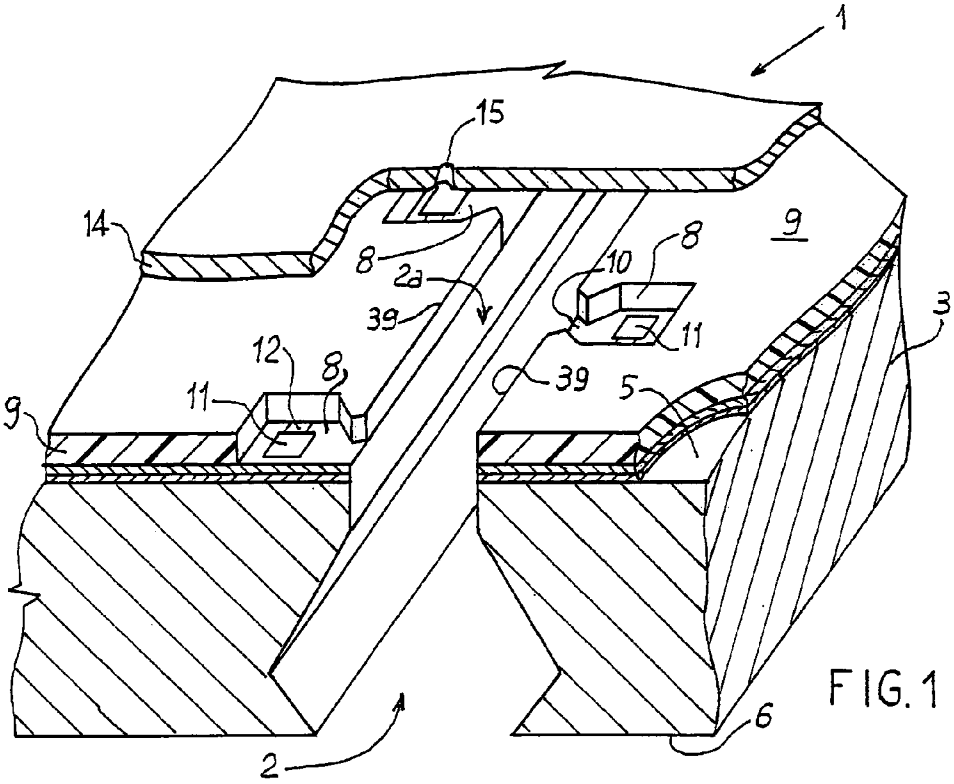
FIG. 1 represents a perspective view in partial section of a printhead showing the disposition of some ink ejection cells, hydraulically connected to a feeding duct built according to this invention.

With reference to FIG. 1, with the numeral 1 is designated as a whole a printhead, in which the feeding duct 2 is built according to the process the subject of this invention.

Figure 4:
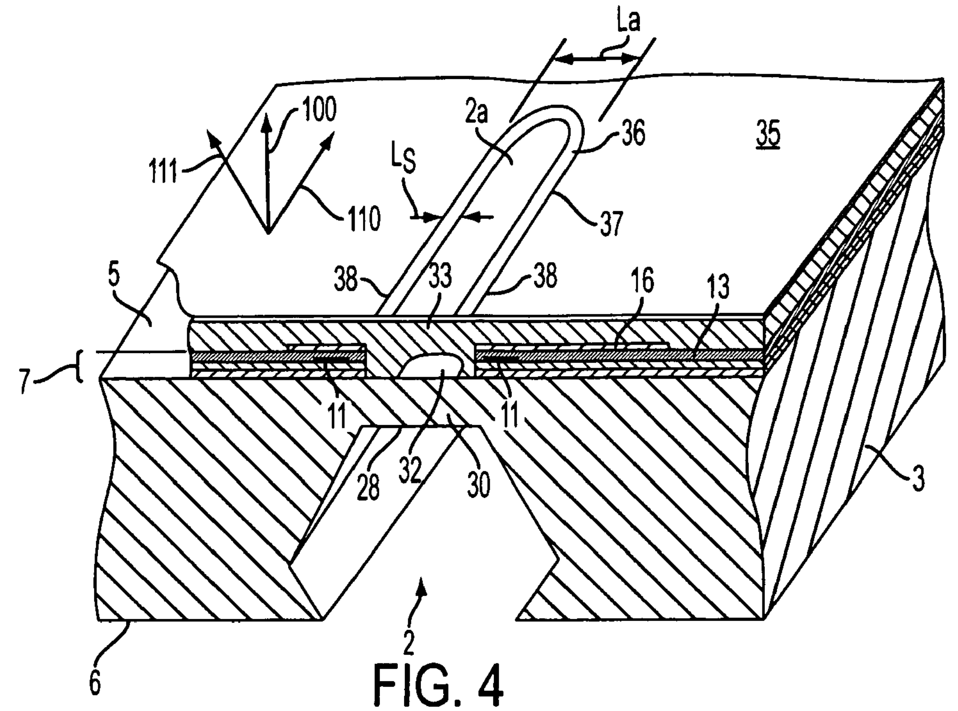

The head 1 is made of a support element or dice 3 of crystalline silicon, cut from a larger disc or wafer with crystallographic orientation <100> (FIG. 4), and of thickness between 500 and 600 μm, delimited by two opposite surfaces 5 and 6 (FIG. 1), flat and parallel, respectively called front surface 5 and rear surface 6 for clarity of the description.

A plurality of cells 8 for expulsion of the ink are made in the thickness of a layer of photosensitive type resin 9, known in the sector art, and communicate hydraulically through channels 10 with the feeding duct 2, constructed according to the process the subject of this invention.

On the bottom of each cell 8 are the heating elements 11, made in a known way, from a layer of electrically resistive material, placed between isolating layers made of silicon nitrides and carbides; the heating elements 11 are in turn electrically connected to electric conductors 12 made in a layer of conducting material, such as aluminium, tantalum, etc. which are connected to external electronic circuits for supplying the electrical pulses for expulsion of the droplets of ink.

Finally on the layer of resin 9 a lamina 14 is stuck, which may be of a metal, such as gold, or nickel, or an alloy thereof, or of a resin, such as Kapton™, which bears the nozzles 15 for ejection of the ink droplets, arranged in correspondence with each cell 8.

The substrate 3 (FIG. 2) is previously passivated on both its opposite surfaces 5 and 6 via the depositing of a dielectric and thermally isolating layer, 17 and 18 respectively, of $SiO_2$, having a thickness of approx. 1.5 μm. The layers 17, 18 constitute a flat and homogeneous base for anchoring the further layers deposited during construction of the head 1.

Each of the layers 17 and 18 is coated with a protective layer 19 of a photosensitive substance. The photosensitive substance normally consists of epoxy and/or acrylic resins, polimerisable through the effect of light radiations.

The protective layer 19, covering the passivator rear surface 18, after being exposed to light with a suitable mask, is developed and partially removed using the known photolithographic technique, to form a rectangular shape aperture 20, elongated in the direction parallel to the crystallographic axis <110> of the silicon substrate 3 (FIG. 1).

Figure 2:
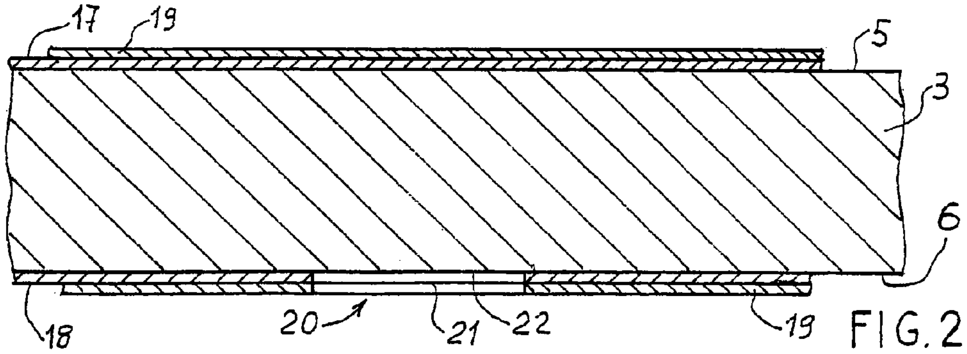
FIGS. 2 to 6 represent the successive stages of the process for manufacture of the ink feeding duct of the head of FIG. 1, according to this invention.

The aperture 20 leaves uncovered a zone 21 of the underlying layer 18 of $SiO_2$, suitable for being corroded subsequently and chemically removed with a selective etching solution based on hydrofluoric acid (HF), to free a corresponding area 22 of the silicon substrate 3 (FIG. 2).

A fuller description of the structure of an ink jet printhead of the type shown in FIG. 1 will be found in the above-mentioned Italian patent No. 1.234.800.

Figure 3:
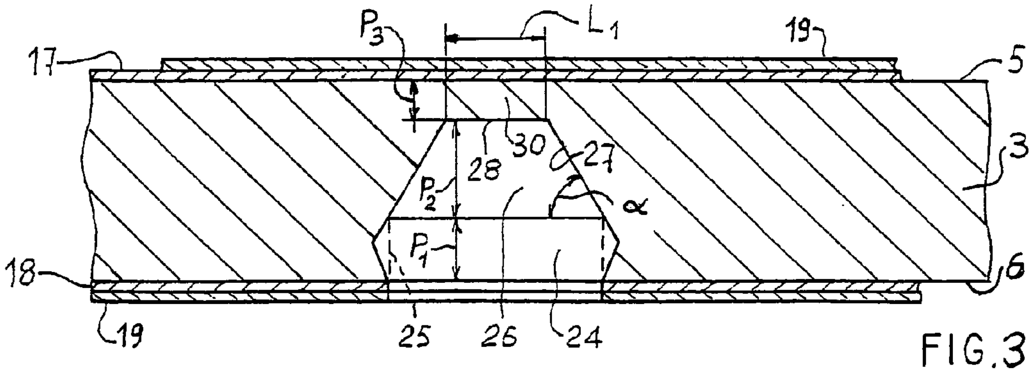

The work for producing the feeding duct 2, according to this invention, starts on the rear surface 6, with a dry etching operation, for instance sand-blasting, of the area 22, performed for a depth $P_1$ of approx. 30% of the thickness of the substrate 3 (FIG. 3); with this operation and using a substrate 3 of silicon of about 600 μm thick, a first cavity 24 of depth $P_1$ of about 180 μm is obtained, with side walls 25 (dashed line) perpendicular to the surface 6 of the substrate 3.

The work continues with an anisotropic electrolytic corrosion operation, in a chemical etching bath, using one of the known anisotropic solutions based on ethylenediamine and pyrocatechol, or based on potassium hydroxide, or again on hydrazine.

Each of the solutions used has a maximum etching gradient "$G_{100}$", which develops according to the direction of the crystallographic axis <100> of the substrate 3 and varying between 0.75 and 1.8 μm/min, at a temperature of roughly 90° C., whereas the ratio $G_{100}/G_{111}$, where $G_{111}$ is the gradient of anisotropic etching according to the crystallographic axis direction <111>, may range between 35:1 and 400:1.

Accordingly the chemical etching in this stage of the process proceeds preferably in the characteristic direction <100> and much less in the direction <111 (see FIG. 4), inclined by an angle a of approximately 50° with respect to the surfaces 5 and 6 of the substrate (FIG. 3); the chemical corrosion in this stage therefore produces a further cavity 26, (FIG. 3) communicating with the cavity 24 and bound by lateral walls 27, inclined by the angle a with respect to the surface 6 of the substrate 3 and by a rear wall 28, opposite the cavity 24. The depth $P_2$ of the cavity 26, reached in the direction perpendicular to the surface 6, depends on the gradient of etching $G_{100}$ of the etching solution employed and by the time taken.

In a preferred embodiment, according to the invention, the chemical etching action is continued until such time as the depth $P_2$ of the cavity 26 reaches a prefixed value of approximately 50% of the thickness of the substrate 3, while the rear wall 28 of the excavation attains a width L1 of approximately 150 μm, so as to leave a diaphragm 30 between the rear wall 28 and the front surface 5 of thickness $P_3$ of approximately 100 μm +/−20 μm, equal to roughly 15%–20% of the thickness of the substrate 3.

At this point, the construction of the feeding duct 2 is interrupted in order to proceed to deposition on the front surface 5 (FIG. 4) of a plurality of layers 7 necessary to create the heating elements 11, the relative electric conductors 12 (FIG. 1), coated in turn with protective layers of silicon nitride and carbide 13, and a layer 16 of tantalum protecting the underlying zone containing the heating elements.

In a second stage of the process, according to the invention, on the layers 7 already deposited on the front surface 5 (FIG. 4), a layer 34 of positive photoresist about 5 μm thick is deposited, which protects the other layers 7 during subsequent work and completely fills up a recess 33 created when, in the zone 2*a* in which the feeding duct 2 will be opened, all the existing layers 17, 19, 13, 16 have been removed with a dry etching process, known in the sector art, leaving free an area 32 of bare silicon of the substrate 3.

The layer 34 of photoresist is exposed through a thin mask 35, of a particular design, according to this invention, and developed in order to bound the outlet area 2*a* (FIG. 4) of the feeding duct 2, in correspondence with the front surface 5.

The mask 35 used in this stage of the manufacturing process contains an aperture 36 consisting of a groove 37 of width Ls, in the shape of a closed, narrow ring elongated in a direction parallel to the crystallographic direction <110> of the silicon substrate 3.

The width Ls of the groove 37 is preferably established as 10–50 μm, whereas the distance La between the external, opposite long sides 38 of the aperture 36 is between 100 and 130 μm, and in any case not greater than the width L1 defined above.

The external long sides 38 of the groove 37 and the distance La between them define respectively the profile and the width of the final outlet aperture 2*a* of the feeding duct 2, in correspondence with the front surface 5; the length of the long sides 38 in the direction <110> depends mainly on the number of nozzles foreseen.

Figure 5:
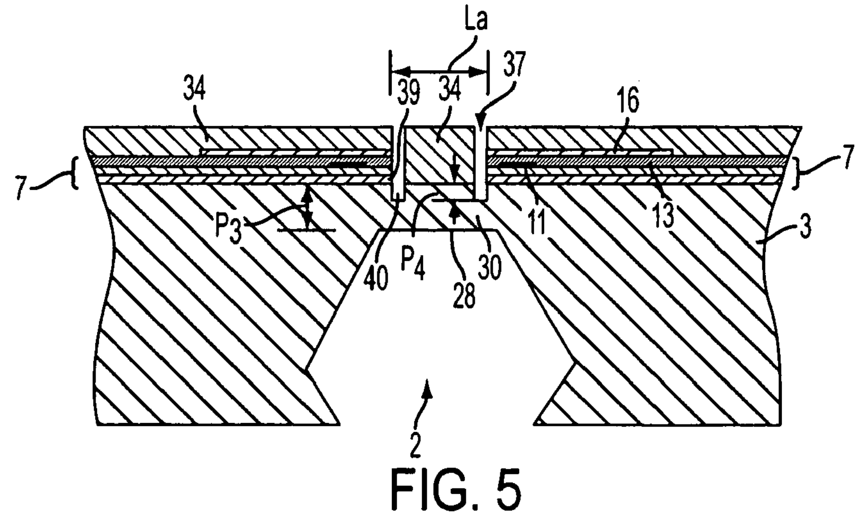

The next step of the process consists in removing the material in the area of the groove 37 in the direction of the rear wall 28, to form a channel 40 (FIG. 5) in the silicon substrate 3, in the thickness $P_3$ of the diaphragm 30, over a depth $P_4$ of 20-50 μm. Etching of the channel 40 is performed with a dry etching technique, known to those acquainted with the sector art, to form with the greatest precision allowed the edges 39 of the channel 37, namely the corner between the channel itself and the front surface 5, and to obtain the distance La between the edges 39 reduced to values of less than 150 μm and preferably to approx. 100 μm.

At the end of this operation, the layer of positive photoresist 34 is removed. In its place, on the front surface 5, a film 9 (FIG. 1, 6) of a photosensitive material, consisting of a negative photopolymer, for example Vacrel™, is laminated, and on this are produced in a photolithographic process the ejection cells 8 and the associated feeding channels 10.

Figure 6:
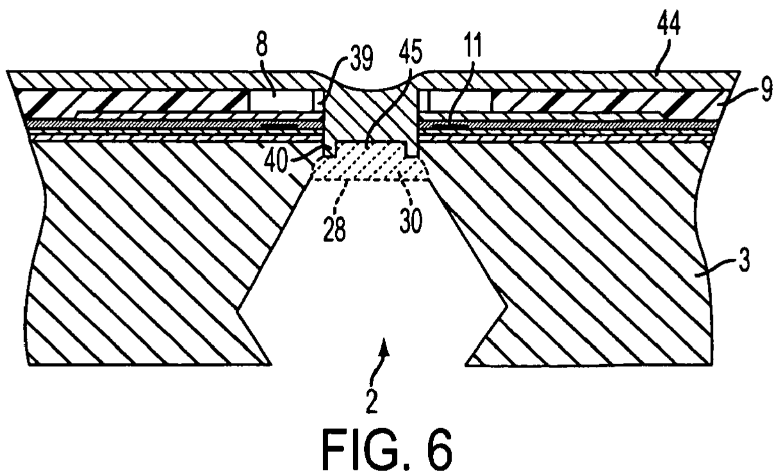

Spread on the photosensitive film 9, accordingly worked, is a protective layer 44 of Emulsitone™ (FIG. 6) which penetrates the groove 40 and prevents shavings from being deposited in the area already worked, in the cells 8 for instance, and avoids further damage in successive work steps.

At this point, the diaphragm 30 is taken away in a cutting operation, preferably employing a beam of copper vapour laser rays; this choice is dictated by the fact that the copper vapour laser allows cutting with extremely high precision of the diaphragm 30, with a low heating of the material around the cut. The laser beam is applied from the rear surface 6 side, against the wall 28 of the recess 26, and is interrupted when the cut reaches the bottom of the channel 40;

by using a laser cut, the walls of the channel thus formed remain perfectly delimited and above all, the layers comprising the head 1 in close proximity of the cutting zone are not damaged, thanks to the limited heating generated by the laser.

Alternatively, progressive sand-blasting may be used to take away the diaphragm 30, where applied from the rear part of the substrate 3, against the wall 28, taking care to successively erode thin layers of material, for example by bringing the sand-blasting nozzle progressively closer, until the cutting reaches the bottom of the channel 40, and results in the detachment of the portion of silicon 45 located inside.

As has been seen, with the manufacturing process described, according to the invention, the feeding duct 2 is made in three successive stages, of which the first stage and the third stage are performed at the rear of the substrate 3, while the second stage is performed at the front. In this way, the edge of the feeding duct at the outlet 2*a* in correspondence with the front surface 5 is produced in the second stage, obtaining maximal precision of dimensions and surface finish, ensured by employing a dry etching in an area with perfectly delineated contours, which can only be obtained by using a mask 35. Furthermore, this avoids the erosive agents of the diaphragm 30, such as sand-blasted grains, or other erosive means, used in the step of removing the diaphragm 30, from impairing the precision produced edge 39, without flakings, and/or irregularities.

Later the layer of Emulsitone™ is eliminated and a sheet of Kapton™ 14 (FIG. 1), bearing one or more rows of nozzles 15, is heat glued on top of the layer 9 containing the cells 8 and the associated feeding channels 10, where each nozzle is placed with the maximum precision in correspondence with the corresponding ejection cell.

It will be understood that changes or variants may be made to the manufacturing process of the feeding duct for an ink jet printhead, according to the invention, and that the head produced in this way may have its shapes and dimensions modified, without however departing from the scope of the invention.

What is claimed is:

1. In an inkjet printhead comprised of a silicon substrate of a given thickness and having a front surface and a rear flat surface opposite and parallel to the front surface, both surfaces being protected by a passivating layer of dielectric material, the silicon substrate having a plurality of layers deposited on the front surface with a plurality of ink ejection cells arranged in the layers to be fed with ink through a feeding duct traversing the silicon substrate, a method for constructing the feeding duct, comprising:

- a first step of eroding the silicon substrate first from the rear surface to a predetermined depth to form a cavity having a rear wall separated from the front surface by a diaphragm;
- a second step of next eroding the silicon substrate from the front surface for etching a channel to a predetermined depth and defining a contour of an outlet area communicating with the ink ejection cells; and
- a third step of subsequently eroding the silicon substrate from the rear surface to remove the diaphragm to form the feeding duct between the rear and front surfaces.

2. The process according to claim 1, wherein said first step comprises the steps of:

- defining an area of predetermined shape on said rear surface, opposite said front surface;
- etching said substrate with a dry process in said area for producing a first recess having lateral walls, perpendicular to said rear surface and extending through said thickness in the direction of said front surface to an initial predetermined depth; and
  - continuing the etching of said recess with an anisotropic electrolytic corrosion, using an anisotropic chemical compound for etching, for a predetermined etching time, to produce a further recess, communicating with said first recess and extending in the direction of said front surface to form the cavity having the rear wall separated from the front surface by the diaphragm.

3. The process according to claim 2, wherein the step of continuing the etching includes using a chemical etching bath, consisting of anisotropic aqueous solution of ethylenediamine and pyrocatechol, of potassium hydroxide, or of hydrazine.

4. The process according to claim 3, wherein the step of continuing the etching includes interrupting the chemical corrosion of the cavity when the thickness of said diaphragm reaches approximately 15%–20% of the thickness of said substrate, and the width of said rear wall measures 100–130 μm.

5. The process according to claim 1, wherein said depth of said cavity is defined as approximately 30% of the thickness of said substrate.

6. The process according to claim 1, wherein said depth is defined as approximately 50% of the thickness of said substrate.

7. The process according to claim 1, wherein the printhead includes a plurality of heating elements corresponding to said plurality of ejection cells, said heating elements being contained inside said cells and being suitable for ejecting a given quantity of ink, and a plurality of electric conductors connected to said heating elements, wherein said second step of said process is preceded by steps including depositing on said front surface a plurality of layers needed for creating said heating elements and said electric conductors, coating said electric conductors, in turn with protective layers of silicon nitride and carbide, and protecting an underlying zone containing the heating elements with a layer of tantalum.

8. The process according to claim 7, wherein said third step is preceded by producing said cells in a layer of photosensitive material, deposited on said plurality of layers.

9. The process according to claim 8, wherein said third step is followed by gluing on said layer of photosensitive material a lamina bearing a plurality of nozzles, aligned with respective cells, for the ejection of ink droplets.

10. An inkjet printhead comprised of a silicon substrate of a given thickness and having a front surface and a rear flat surface opposite and parallel to the front surface, the silicon substrate having a plurality of layers deposited on the front surface with a plurality of ink ejection cells arranged in the layers to be fed with ink through a feeding duct traversing the silicon substrate, wherein the feeding duct in the substrate is created according to the process of claim 1.

11. In an inkiet printhead comprised of a silicon substrate of a given thickness and having a front surface and a rear flat surface opposite and parallel to the front surface, both surfaces being protected by a passivating layer of dielectric material, the silicon substrate having a plurality of layers deposited on the front surface with a plurality of ink ejection cells arranged in the layers to be fed with ink through a feeding duct traversing the silicon substrate, a method for constructing the feeding duct, comprising:

- a first step of eroding the silicon substrate first from the rear surface to a predetermined depth to form a cavity having a rear wall separated from the front surface by a diaphragm;
- a second step of next eroding the silicon substrate from the front surface for etching a channel to a predetermined depth and defining a contour of an outlet area communicating with the ink ejection cells; and
- a third step of subsequently eroding the silicon substrate from the rear surface to remove the diaphragm to form the feeding duct between the rear and front surfaces, wherein the second step comprises the following steps:
- defining on said front surface an area, ring-shaped, elongated and parallel to a characteristic crystallographic direction of said substrate; and etching said substrate with a dry process in said ring-shaped area, for a predetermined depth, in said diaphragm, in the direction of said rear wall, to produce a ring-shaped channel, defining the contour of the outlet area.

12. The process according to claim 11, wherein the third step comprises the following step:

progressively eroding said diaphragm, from said rear surface, starting from said rear wall, in the direction of said front surface, until said ring-shaped groove is met, in order to open said feeding duct between said front surface and said rear surface.

13. The process according to claim 12, wherein the step of progressively eroding said diaphragm includes using a copper vapour laser beam.

14. Process according to claim 12, wherein the step of progressively eroding said diaphragm includes successively removing thin layers of said diaphragm with progressive application of a sand blasting jet.

15. The process according to claim 11, wherein the step of defining on the front surface comprises using a layer of positive photoresist of a thickness of approximately 5 μm, which is exposed and developed using a mask having an aperture in the form of a narrow, ring-shaped groove, elongated in a direction parallel to the crystallographic direction of said substrate for delimiting the outlet area of said feeding duct, in correspondence with said front surface.

16. The process according to claim 11, wherein said step of etching said substrate with a dry process in said ring-shaped area includes etching said ring-like channel to a predetermined depth of approximately 20–50 μm.

* * * * *